United States Patent [19]

Lin

[11] Patent Number: 5,693,129
[45] Date of Patent: Dec. 2, 1997

[54] INK JET INK COMPOSITIONS COMPRISING ANTI-CURL HYDROXYAMIDE DERIVATIVES AND PRINTING PROCESSES

[75] Inventor: John Wei-Ping Lin, Webster, N.Y.

[73] Assignee: Xerox Corporation, Stamford, Conn.

[21] Appl. No.: 785,175

[22] Filed: Jan. 13, 1997

[51] Int. Cl.$^6$ .................................................. C09D 11/02
[52] U.S. Cl. ................................. 106/31.43; 106/31.75
[58] Field of Search .................... 106/20 R, 22 H, 106/23 H, 20 D, 31.43, 31.75

[56] References Cited

U.S. PATENT DOCUMENTS

| | | | |
|---|---|---|---|
| 3,889,269 | 6/1975 | Meyer et al. | 106/22 B |
| 4,251,824 | 2/1981 | Hara et al. | 346/140 R |
| 4,327,174 | 4/1982 | Von Meer | 430/530 |
| 4,410,899 | 10/1983 | Haruta et al. | 346/140 R |
| 4,412,224 | 10/1983 | Sugitani | 346/1.1 |
| 4,463,359 | 7/1984 | Ayata et al. | 346/1.1 |
| 4,532,530 | 7/1985 | Hawkins | 346/140 R |
| 4,601,777 | 7/1986 | Hawkins et al. | 156/626 |
| 5,080,716 | 1/1992 | Aoki et al. | 106/22 H |
| 5,139,574 | 8/1992 | Winnik et al. | 106/22 R |
| 5,145,518 | 9/1992 | Winnik et al. | 106/20 R |
| 5,173,112 | 12/1992 | Matrick et al. | 106/22 H |
| 5,207,824 | 5/1993 | Moffatt et al. | 106/22 R |
| 5,220,346 | 6/1993 | Carreira et al. | 106/22 R |
| 5,223,026 | 6/1993 | Schwarz, Jr. | 106/22 H |
| 5,281,261 | 1/1994 | Lin | 106/20 R |
| 5,356,464 | 10/1994 | Hickman et al. | 106/20 R |
| 5,531,818 | 7/1996 | Lin et al. | 106/23 C |

*Primary Examiner*—Helene Klemanski
*Attorney, Agent, or Firm*—Oliff & Berridge

[57] ABSTRACT

An ink jet ink composition comprises water; a colorant selected from the group consisting of a dye, a pigment, and a mixture of a dye and pigment; and a material selected from the group consisting of (1) a hydroxyamide derivative having at least one hydroxyl group and at least one amide group; (2) a mercaptoamide derivative having at least one mercaptol group and at least one amide group; (3) a hydroxythioamide derivative having at least one hydroxyl group and at least one thioamide group; (4) a mercaptothioamide derivative having at least one mercaptol group and at least one thioamide group; (5) an oxyalkylene(alkyleneoxide) reaction product of the above said derivatives; (6) a thioalkylene(alkylenesulfide) reaction product of the above said derivatives; and (7) mixtures thereof. The inks comprising the said ink jet ink composition exhibit good latency especially in a high resolution thermal ink jet printhead (e.g., 600 spi) and can be printed onto a print substrate either with or without heat for the drying to give excellent images with reduced curl and cockle.

29 Claims, No Drawings

INK JET INK COMPOSITIONS COMPRISING ANTI-CURL HYDROXYAMIDE DERIVATIVES AND PRINTING PROCESSES

BACKGROUND OF THE INVENTION

1. Field of Invention

The present invention is directed to aqueous ink compositions. More specifically, the present invention is directed to aqueous ink compositions comprising hydroxyamide derivatives and their oxyalkylene reaction products as humectants and anti-curl ink additives for use in ink jet printing processes.

2. Description of Related Art

Ink jet printing is a non-impact printing method that produces droplets of ink that are deposited on a print substrate (recording medium) such as paper or transparent film in response to an electronic digital signal. Thermal or bubble jet drop-on-demand ink jet printers have found broad applications as output for personal computers in the office and in the home.

In existing thermal ink jet printing processes, the printhead typically comprises one or more ink jet ejectors, each ejector including a channel communicating with an ink supply chamber, or manifold, at one end and having an opening at the opposite end, referred to as a nozzle. A thermal energy generator, usually a resistor, is located in each of the channels at a predetermined distance from the nozzles. The resistors are individually addressed with a current pulse to momentarily vaporize the ink within the respective channel to form a bubble that expels an ink droplet. As the bubble grows, the ink rapidly bulges from the nozzle and is momentarily contained by the surface tension of the ink as a meniscus. This is a very temporary phenomenon, and the ink is quickly propelled toward a print sheet. As the bubble begins to collapse, the ink still in the channel between the nozzle and bubble starts to move towards the collapsing bubble, causing a volumetric contraction of the ink at the nozzle and resulting in the separation of the bulging ink from the nozzle as a droplet. The acceleration of the ink out of the nozzle while the bubble is growing provides the momentum and velocity for propelling the ink droplet in a substantially straight line direction towards a print substrate, such as a piece of paper. Subsequently, the ink channel refills by capillary action and is ready for the next repeating thermal ink jet process. Thermal ink jet processes are well known and are described in, for example, U.S. Pat. Nos. 4,251,824, 4,410,899, 4,412, 224, 4,463,359, 4,532,530, 4,601,777, 5,139,574, 5,145,518 and 5,281,261, the entire disclosures of which are incorporated herein by reference. Because the droplet of ink is emitted only when the resistor is actuated, this type of thermal ink jet printing is known as "drop-on-demand" printing. Other types of drop-on-demand printing such as piezoelectric ink jet printing and acoustic ink jet printing are also known.

A continuous ink jet printing is also known. In a continuous ink jet system, ink is emitted in a continuous stream under pressure through at least one orifice or nozzle. Multiple orifices or nozzles may be used to increase imaging speed and throughput. The ink is ejected out of orifice and perturbed, causing it to break-up into droplets at fixed distance from the orifice. At the break-up point, the electrically charged ink droplets are passed through an applied electrode that is controlled and switched on and off in accordance with digital data signals. Charged ink droplets pass through a controllable electric field that adjusts the trajectory of each ink droplet in order to direct it to either a gutter for ink deletion and recirculation or a specific location on a recording substrate to create images.

In an ink jet printing apparatus, the printhead typically comprises a linear array of ejectors, and the printhead moves relative to the surface of the print substrate, either by moving the print substrate relative to a stationary printhead, or vice-versa, or both. In some types of apparatus, at least a relatively small printhead supplied with an ink moves across a print sheet numerous times in swathes in order to complete an image. For multi-color ink jet printing a set of printheads and inks (e.g., cyan, magenta, yellow, and black) can move across the print substrate numerous times in swathes and disperse selected inks in any desired patterns (e.g., ⅛, ¼, ½, fulltone (1/1)) according to digital signals. The speed of this type of single or multiple color ink jet printing on a substrate is determined by the moving speed of printheads across the print substrate, ink jetting frequency (or frequency response), and the desired number of swathes needed for printing. The printing speed of this type of ink jet apparatus can be increased if two or more printheads are budded together to form a partial-width array printhead for printing each ink in a monochrome or multi-color ink jet printing sytem. The partial-width ink jet printhead has more ink jet nozzles per printhead, and it can deliver a large number of ink droplets across the substrate in a swath in a short period of time. Monochrome or multi-color ink jet printing apparatus using one or several partial-width prinheads may have a faster printing speed than the current commercial ink jet printers.

Alternatively, a printhead that consists of an array of ejectors (e.g., several butted printheads to give a full-width array printhead) and extends the full width of the print substrate may pass an ink down once onto the print substrate to give full-page images, in what is known as a "full-width array" printer. When the printhead and the print substrate are moved relative to each other, image-wise digital data is used to selectively activate the thermal energy generators in the ink jet printhead over time so that the desired image will be created on the print substrate at a fast speed. For multi-color ink jet printing, several full-width array printheads and inks (e.g., cyan, magenta, yellow, and black) can be used to deliver multiple color inks onto a print sheet. This type of multi-color ink jet printing process is capable of printing multiple color images and monochrome images on a print substrate at a much faster speed (e.g., more than five pages of full color images per minute) than the current commercial color ink jet printers.

With the demand for higher resolution printers, the nozzles of a printhead or partial-width printhead or full-width array printhead in ink jet printers are decreasing in size. Nozzle openings are typically about 50 to 80 micrometers in width or diameter for 300 spots per inch (spi) resolution printers. With the advent of higher resolution (e.g., 400 spi and 600 spi) printers, these nozzle openings are typically about 10 to about 49 micrometers in width or diameter. High resolution ink jet printheads with small nozzle openings tend to restrict ink flow and to form undesired plugs easily due to ink evaporation and faster increase of ink viscosity as compared to low resolution ink jet printheads with large nozzle openings. For high resolution printing, these printheads, partial-width printheads and full-width printheads with small nozzle dimensions require inks that do not easily plug the small openings and can be jetted effectively.

A major concern with all ink jet printers, and high resolution ink jet printers in particular, is plugging or clogging of nozzles during operation and between operations. This is caused by evaporation of an organic solvent or water or both from the opening of the nozzle. In dye-based inks, this evaporation can cause crystallization or precipitation of soluble components such as dye or solid additives and increase viscosity of the ink fluid. In pigment-based inks, this evaporation can cause precipitation or agglomeration of the pigment particles due to destabilization of a pigment dispersant and pigment particles. In addition, it can increase the chance of pigment particle collision in the ink, thereby causing flocculation or agglomeration, or aggregation of the pigment particles. Precipitation of solid ink additives and an increase in viscosity of ink fluid may also occur. The precipitation of pigments and solid ink additives as well as the increase in ink viscosity affect the ability of the heater (i.e., a resistor) of a printhead to fire a successful drop of ink through a nozzle.

The inception of plugging may cause distortion of the image or alphanumeric characters being printed by the printhead. This may appear as a drop of ink that is small or that is displaced from its intended position (misdirectionarity). On some occasions, the ink droplet may even reach its intended position but at a lower drop volume producing a lower optical density image. Ultimately, the plugged nozzle may fail to fire entirely, and no image will be generated.

Ink jet printers are designed to prevent excessive evaporation of solvent from printhead nozzles by sealing the printhead or printbars in a maintenance station such as an air-tight chamber when they are not in use. These printheads may become ineffective when they are either away from the maintenance station during the printing mode or with continued printer use because dried ink deposits can be formed at the front face of a printhead due to some undesired ink spatter and imperfect rubber seals of the air-tight chamber in a maintenance station, that cause the system to lose its air-tight condition. Another device used to prevent clogging of the printhead nozzle is a wiper that removes solid formed near or at the opening of a nozzle. This device may be ineffective because of the depth of the plug or because of sufficient hardness of the plug, which resists easy mechanical removal. Another clogging remedy is the use of forced air or vacuum suction to clear the nozzle of any deposits. However, these devices may require a vacuum pump and other accessories, thereby adding considerable expense to the costs of the printer and the need for frequent cleaning.

Another commonly used mechanism to cure clogging is to clear the nozzle by firing the printhead in a non-image mode, e.g., into a collection receptacle. While this solution is an effective remedy, it requires that the ink form a soft or non-cohesive plug. To make this non-image clearance process effective, the ink in the nozzle must be mechanically or cohesively weak for easy jetting. Therefore, a critical requirement for an ink jet ink is the ability of the ink to remain in a liquid and jettable condition in a printhead opening that is exposed to air. The maximum idling time at a relative humidity of 15% that still allows a printhead to function properly with a transit time of equal to or less than 80 microseconds for an ink to travel a distance of 0.5 mm after a period of non-use or idling is called the latency or decap time. This test is run with the printhead or nozzles uncovered or decapped and generally at a relative humidity of 15% to simulate a harsh condition. The time interval is the longest length of time that the printhead, uncovered, will still fire a specified drop of ink without a failure. The longer the latency time, the more desirable is the ink for use in an ink jet printer. The latency of an ink is often increased by the addition of a humectant or co-solvent. The long latency requirement is especially important for a high resolution ink jet printhead because of its small orifice openings.

Another important requirement for ink jet inks, especially for pigment-based inks, is for the pigment particles to remain stable and uniformly dispersed in the ink throughout the life of the ink jet cartridge. Dye-based ink jet inks are homogeneous systems without pigment particles but suffer from deficiencies in waterfastness (water resistance), and lightfastness (light resistance) after being printed on various substrates. Pigment inks provide an image with high optical density and sharp edges as well as very good waterfastness and lightfastness. Therefore, pigments are a preferred alternative to dyes in an ink jet ink, provided that the pigment particles and dispersions can be made stable to prevent undesired flocculation and/or aggregation and settling. U.S. Pat. No. 5,281,261 to Lin and U.S. patent application Ser. No. 08/483,769 to Lin, Fague, and Wong, now abandoned the entire disclosure of which is incorporated herein by reference, describe pigment-based ink jet inks, ink properties, and their applications.

Many state-of-the-art commercial ink jet inks including some dye-based inks (e.g., black, cyan, magenta and yellow inks) and pigment-based inks show a short latency (<5 sec.) when they are used in conjunction with a high resolution (>360 spi, for example 600 spi) printhead of a side shooter configuration (i.e., ink jetting direction is not perpendicular to the heater or resistor surface) with a channel width or nozzle diameter of about 10 to 49 microns. Thus, there is a need to provide dye-based and pigment-based inks that have good latency, especially when they are used in a high resolution printhead.

There continues to be a demand for inks having the above-mentioned desirable characteristics for high speed and high resolution ink jet printing. Moreover, certain ink jet printers such a those with a fast printing speed require ink jet inks providing sufficient optical density in a single pass, i.e., without applying additional ink to the print substrate (or paper) by a reciprocating process (e.g., checkerboarding).

There is also a need for inks that provide high optical density not only for printing in a single pass mode but also in a multiple pass mode. Furthermore, there is a need to provide inks that are capable of printing at high speed. This requires a high jetting frequency response (e.g., greater than 3.0 kHz). In addition, there is a need for an ink jet ink that not only can be used in a fast speed, high resolution printer but also possesses anti-curl and/or anti-cockle properties after it is printed on a print substrate.

In printing a solid area, a large quantity of an aqueous ink jet ink is deposited on a print substrate (e.g., plain papers) which can cause curl upon drying possibly due to the formation of differential stress between the imaging surface and the nonimaging surface. In a severe case, the paper printed with an ink to cover a large solid area bends toward the image and forms a scroll or a tube. This type of severe paper curl creates a problem for viewing and storing ink jet images for archival purpose. One of the methods to reduce curl is to use a printing method and apparatus as described in pending U.S. patent application Ser. No. 08/596,821 to Lin, the entire disclosure of which is incorporated herein by reference. Another method to reduce paper curl is to use a curl reducing agent in ink jet inks. A desirable curl reduction agent will not interfere with the jetting performance of an ink and will provide long latency for high resolution printing and good compatibility with other ingredients in inks including dyes and pigments. Therefore, there is a need for obtaining a novel curl reducing agent in ink jet ink that can be jetted properly.

The use of heating elements (commonly employed to increase the rate of drying of aqueous inks) are known to reduce curl. Various mechanical devices to reduce curl such as heated rollers and tension applicators have been tried. These devices are only marginally effective and add considerably to the cost and size of the printer. Heated rollers used to reduce curl differ from the heating devices or methods used to increase drying rate, such as microwave heating, radiant heating, heated platen, forced hot air heating, convection heating, and the like. In heaters to reduce curl, heat is applied to both sides of the paper under pressure or tension after printing. In heaters to increase the drying rate, heat can be applied at any stage during the printing process without using pressure. Microwave dryers, for example, are set forth in U.S. Pat. Nos. 5,220,346 to Carreira et al. and 4,327,174 to Von Meer, the disclosures of which are incorporated herein by reference. The inks employed in ink jet printers having microwave dryers include metal salts that improve the rate of drying. Such additives, however, do not prevent paper curl. Therefore, there is a need for aqueous ink compositions that reduce paper curl, thus eliminating the need for expensive, ineffective and cumbersome mechanical devices or special print media.

In an effort to reduce paper cockle and curl in ink jet printers, efforts have been made to provide anti-curl and anti-cockle agents to reduce this problem. For example, U.S. Pat. No. 5,356,464 to Hickman et al. describes anti-curl agents that may be utilized in ink jet inks. U.S. Pat. No. 5,207,824 to Moffatt et al. describes an ink jet ink comprising an anti-cockle agent for thermal ink jet printers. Some of those materials have undesirable high viscosity at a concentration that is effective for curl reduction. Sometimes they tend to contribute to low latency for inks intended for high resolution ink jet printing and jetting difficulty.

Another problem encountered in employing aqueous ink jet ink compositions is kogation. Occasionally, as an ink in an ink jet printhead comprising resistors (or thermal energy generators) is heated and vaporized, some of the ink components will undergo thermal breakdown. This thermal decomposition leads to deposition of residue on the resistor's surface which is known in the art as "kogation." Such ink deposits insulate the thermal heating of an ink on the resistor surface, thereby causing reduced efficiency of bubble formation, decreased ejection velocity of the ink drops, reduced drop volume delivered to the print substrate and ink misdirectionality. Consequently, print quality is reduced and the incapability of bubble formation may result in failure of the printhead and ink jet printer to print. Thus, ink jet ink compositions employing materials like novel humectants that can reduce (1) the rate of evaporation of the ink jet ink, (2) the chance of clogging of the ink jet nozzles, and (3) the rate of formation of kogation are particularly desirable.

SUMMARY OF THE INVENTION

The ink jet ink compositions of the present invention fulfill the above needs without any deleterious effects such as inducing undesired plug of the printhead nozzles or inferior print quality.

The present invention relates to aqueous ink jet inks comprising hydroxyamide derivatives having at least one hydroxyl group and at least one amide group in a compound. The present invention also relates to ink jet inks comprising reaction (condensation) products of the hydroxyamide derivatives with an alkyleneoxide, including ethyleneoxide or propyleneoxide and mixtures thereof.

The hydroxyamide derivatives and their oxyalkylene reaction products are water soluble or compatible and can be used as humectants, thereby providing the aqueous ink jet ink with long latency. For example, the ink jet inks in embodiments of the present invention possess a latency of greater than or equal to 10 seconds in a printer having at least one nozzle of a channel width (nozzle opening) in the range from 10 to about 49 microns. In addition, the humectants of this invention also give ink jet ink compositions a good curl reduction property.

The ink jet inks of the present invention can be employed for both dye-based and pigment-based inks. The ink jet inks of the present invention have the advantages of reducing (1) the rate of ink evaporation; (2) the undesired clogging of the ink jet nozzles with a colorant or a solid ink additive; (3) kogation; and (4) paper curl. The present invention also provides ink jet inks having improved jetting efficiency and print quality for high resolution printers. The present invention provides ink jet inks that are capable of printing at a fast speed.

DETAILED DESCRIPTION OF PREFERRED EMBODIMENTS

The present invention is directed to ink jet inks comprising at least (1) a hydroxyamide derivative having at least one hydroxyl group and at least one amide group, (2) an isomer of such a hydroxyamide derivative containing at least a heteroatom (e.g., N, S, Se and the like either with or without an aromatic and/or heterocyclic ring), (3) an oxyalkylene (alkyleneoxide) reaction product of the aforementioned derivatives, (4) isomers of the aforementioned derivatives, and (5) mixtures thereof. The concentration of the above said hydroxyamide derivative or isomers in an ink jet ink can vary from about 0.1 to 40 wt. % of total ink weight, preferably from 1 to 30 wt. %.

One embodiment of the present invention is directed to ink jet inks containing a hydroxyamide derivative having at least one hydroxyl group and one amide group in a compound. Such hydroxyamide derivatives are generally represented by the following formula:

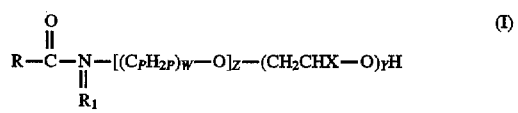

$$R-\overset{O}{\underset{\underset{R_1}{|}}{C}}-N-[(C_PH_{2P})_W-O]_Z-(CH_2CHX-O)_YH \qquad (I)$$

wherein R is independently selected from the group consisting of H, $C_nH_{2n+1}$, cyclic $C_nH_{2n-1}$, $C_6H_5$, $C_5H_4N$, substituted or unsubstituted aromatic groups and heterocyclic groups with carbon atoms from three to twenty, and $OC_nH_{2n+1}$ wherein n is from one to forty; $R_1$ is independently selected from the group consisting of H, $C_mH_{2m+1}$, cyclic $C_mH_{2m-1}$, $C_6H_5$, $C_5H_4N$, polethyleneglycoxyphenyl (a group derived from the reaction of a hydroxyphenyl moiety (phenol) and ethyleneoxide), polpropyleneglycoxyphenyl (a group derived from the reaction product of hydroxyphenyl moiety (phenol) and propyleneoxide), poly(ethylene-co-propylene)glycoxyphenyl (a group derived from the reaction product of hydroxyphenyl moiety and a mixture of ethyleneoxide and propyleneoxide), and substituted and unsubstituted aromatic groups and heterocyclic groups with from three to twenty carbon atoms, wherein m is from one to forty; X is independently selected from H and $C_kH_{2k+1}$ where k is from zero to twenty; P is from two to twenty; W is from one to twenty; Y is from zero to forty; Z is from zero to forty; and Z+Y must be one or greater than one.

Examples of such hydroxyamide derivatives include, but are not limited to, N-(2-hydroxyethyl)butyric acid amide; N-butyl-N-(2-hydroxyethyl)butyric acid amide; N-propyl-N-(2-hydroxyethyl)butyric acid amide; N-ethyl-N-(2-hydroxyethyl)butyric acid amide; N-methyl-N-(2-hydroxyethyl)butyric acid amide; N-(2-hydroxyethyl) butyric acid amide; N-(2-hydroxyethyl)propionic acid amide; N-butyl-N-(2-hydroxyethyl)propionic acid amide; N-propyl-N-(2-hydroxyethyl)propionic acid amide; N-ethyl-N-(2-hydroxyethyl)propionic acid amide; N-methyl-N-(2-hydroxyethyl)propionic acid amide; N-(2-hydroxyethyl)propionic acid amide; N-butyl-N-(3-hydroxypropyl)butyric acid amide; N-propyl-N-(3-hydroxypropyl)butyric acid amide; N-ethyl-N-(3-hydroxypropyl)butyric acid amide; N-methyl-N-(3-hydroxypropyl)butyric acid amide; N-(3-hydroxypropyl) butyric acid amide; N-butyl-N-(3-hydroxypropyl)propionic acid amide; N-propyl-N-(3-hydroxypropyl)propionic acid amide; N-ethyl-N-(3-hydroxypropyl)propionic acid amide; N-methyl-N-(3-hydroxypropyl)propionic acid amide; N-(3-hydroxypropyl)propionic acid amide; N-acetylethanolamine (N-(2-hydroxyethyl) acetic acid amide); N-methylacetylethanolamine (N-methyl-N-(2-hydroxyethyl)acetic acid amide); N-ethylacetylethanolamine(N-ethyl-N-(2-hydroxyethyl) acetic acid amide); N-propylacetylethanolamine (N-propyl-N-(2-hydroxyethyl)acetic acid amide); N-butylacetylethanolamine (N-butyl-N-(2-hydroxyethyl) acetic acid amide); N-acetylpropanolamine (N-(3-hydroxypropyl)acetic acid amide); N-methyl-N-acetylpropanolamine (N-methyl-N-(3-hydroxypropyl)acetic acid amide); N-ethy-N-acetylpropanolamine (N-ethyl-N-(3-hydroxypropyl)acetic acid amide); N-propyl-N-acetylpropanolamine (N-propyl-N-(3-hydroxypropyl)acetic acid amide); N-butyl-N-acetylpropanolamine (N-butyl-N-(3-hydroxypropyl)acetic acid amide); N-acetylbutanolamine (N-(4-hydroxybutyl)acetic acid amide); N-methyl-N-acetylbutanolamine (N-methyl-N-(4-hydroxybutyl)acetic acid amide); N-ethyl-N-acetylbutanolamine (N-ethyl-N-(4-hydroxybutyl)acetic acid amide); N-propyl-N-acetylbutanolamine (N-propyl-N-(4-hydroxybutyl)acetic acid amide); N-butyl-N-acetylbutanolamine (N-butyl-N-(4-hydroxybutyl)acetic acid amide); N-acetyl-N-benzyl-2-ethanolamine (N-benzyl-N-(2-hydroxyethyl)acetic acid amide); N-acetyl-N-imidazoyl-2-ethanolamine (N-imidazoyl-N-(2-hydroxyethyl)acetic acid amide); N-acetyl-N-4-pyridyl-2-ethanolamine (N-pyridyl-N-(2-hydroxyethyl)acetic acid amide, a representative of a heterocyclic material); isomers of the aforementioned derivatives including those of propionic acid amides and butanoic acid amides; and the like; as well as mixtures thereof. These compounds have one hydroxyl group and one amide group in the molecule and its concentration in an ink jet ink can vary from 0.1 to 40% by weight of total ink weight, preferably from 1 to 30% by weight.

The present invention also relates to ink jet inks comprising a hydroxyamide derivative containing at least an oxyalkylene moiety. Said hydroxyamide derivative is a reaction product of at least a hydroxyl group of a hydroxyamide derivative and at least an alkyleneoxide (oxyalkylene). In embodiments, the hydroxyamide derivative is represented by one of compounds in the formula (I) above, and it can form a reaction product with oxyalkylenes (alkyleneoxides) that include compounds such as ethyleneoxide (unsubstituted oxyalkylene), propyleneoxide, and the like. Such oxyalkylene reaction products of the hydroxyamide derivatives are formed by a reaction (condensation) that combines them together and in some cases may also be represented by the formula (I). Several oxyalkylene molecules can be linked together with a hydroxyamide through the hydroxyl group of the hydroxyamide derivative.

Such reaction products include, but are not limited to, N-acetyl-N-(2-hydroxypolyethyleneoxy)ethylamine; N-acetyl-2-(hydroxypolypropyeneoxy)ethylamine; N-acetyl-N-(2-hydroxypoly(ethyleneoxy-co-propyleneoxy))ethylamine; N-acetyl-N-methyl-2-(hydroxypolyethyleneoxy)ethylamine; N-acetyl-N-methyl-2-(hydroxypolypropyleneoxy)ethylamine; N-acetyl-N-ethyl-2-(hydroxypolyethyleneoxy)ethylamine; N-acetyl-N-ethyl-2-(hydroxypolypropyleneoxy)ethylamine; N-acetyl-N-methyl-3-(hydroxypolyethyleneoxy)propylamine; N-acetyl-N-methyl-3-(hydroxypolypropyleneoxy)propylamine; N-acetyl-N-ethyl-3-(hydroxypolyethyleneoxy)propylamine; N-acetyl-N-ethyl-3-(hydroxypolypropyleneoxy)propylamine; N-acetyl-N-phenyl-2-(hydroxypolyethyleneoxy)ethylamine; N-acetyl-N-4-pyridyl-2-(hydroxypolyethyleneoxy)ethylamine; 2-acetamidophenol; 3-acetamidophenol; 4-acetamidophenol; 2-acetamidophenoxypolyethyleneglycol; 2-acetamidophenoxypolypropyleneglycol; 3-acetamidophenoxypolyethyleneglycol; 3-acetamidophenoxypolypropyleneglycol, 4-acetamidophenoxypolyethyleneglycol; 4-acetamidophenoxypolypropyleneglycol 2-acetamidophenoxypoly(ethylene-co-propylene)glycol, 3-acetamidophenoxypoly(ethylene-co-propylene)glycol, 4-acetamidophenoxypoly(ethylene-co-propylene)glycol, and the like as well as mixtures thereof. The concentration of the above reaction products of an oxyalkylene (alkyleneoxide) in an ink jet ink can vary from 0.1 to 40% by weight of total ink weight, preferably from 1 to 30% by weight.

The hydroxyl and amide functional groups of the hydroxyamides are polar functional groups that are compatible with water and can interact with cellulosic materials including papers. It is believed that these unique properties allow the hydroxyamides to be used in ink jet inks (especially aqueous ink jet inks) to reduce the evaporation of water and as humectants in inks for increasing latency and to bond with the hydroxyl groups of cellulose (in paper, fibers, textile material, and other polar substrates) through hydrogen bonding to reduce cockle and curl.

Examples of useful hydroxyamide derivatives of this invention comprising more than one hydroxyl group and at least one amide group in a compound include, but are not limited to, N-acetyldiethanolamine ($C_6H_{13}NO_3$, two hydroxyl groups and one amide group in the compound), propionyldiethanolamine ($C_7H_{15}NO_3$, two hydroxyl groups and one amide group in the compound), and N,N-bis (hydroxyethyl)isonicotinamide (two hydroxyl groups and one amide group with a heterocyclic moiety). These compounds are generally represented by formula (II) below. They can also react with an oxyalkylene (alkyleneoxide) including ethyleneoxide, propyleneoxide and a mixture of both oxyalkylenes through their hydroxyl groups to give rise to new hydroxyamide derivatives (having two or more hydroxyl groups and at least one amide group), which are also within the scope of this invention and in some cases they can also be represented by formula (II) below. The concentration of the above hydroxyamide derivatives in an ink jet ink can vary from 0.1 to 40% by weight of total ink weight, preferably from 1 to 30% by weight.

Examples of useful hydroxyamide derivatives of this invention comprising two or more amide groups and at least a hydroxyl group in a compound include, but are not limited to, 1-(2-hydroxyethyl)-2-imidazolidinone (two amide groups and one hydroxyl group in the compound), N,N'-Bis (2-hydroxyethyl)oxamide (two amide groups and two hydroxyl groups in the compound), 1,3,5-tris(2-hydroxyethyl)cyanuric acid (three hydroxyl groups and three amide groups in the compound), tris(3,5-di-(tert-butyl)-4-hydroxybenzyl)isocyanurate (three hydroxyl groups and three amide groups in the compound), their isomers, and mixtures thereof. The concentration of the above hydroxyamide derivatives in ink jet ink can vary from 0.1 to 40% by weight of total ink weight, preferably from 1 to 30%.

Useful hydroxyamide derivatives of this invention can also comprise an amide group that is part of a cyclic structure of a compound containing at least one hydroxyl group. Such hydroxyamide derivatives may be cyclic compounds which include, but not limited to, 1-(4-hydroxybutyl)-2-pyrrolidinone, 1-(3-hydroxyethyl)-2-pyrrolidinone, 1-(2-hydroxypropyl)-2-pyrrolidinone, 1-(4-hydroxyphenyl)-2-pyrrolidinone derivatives (including different isomers), 1-hydroxyethyl-3-pyrazolidinone derivatives (including different isomers), 1-alkyl-4-hydroxyethyl-2-piperidone derivatives (including different isomers and alkyl group consists of methyl, ethyl, propyl, and the like), N-(2-hydroxyethyl)-phthalimide, N-(3-hydroxypropyl)-phthalimide N-(4-hydroxybutyl)-phthalimide, 4-(2-hydroxyethyl)-N-formylpiperidine, 4-(2-hydroxyethyl)-N-acetylpiperidine, 4-(3-hydroxypropyl)-N-acetylpiperidine, 4-(3-hydroxypropyl)-N-formylpiperidine, their isomers, and the like as well as mixtures thereof. The concentration of the above hydroxyamide derivatives in an ink jet ink can vary from 0.1 to 40% by weight and preferably from 1 to 30%.

The ink jet inks of the present invention may comprise hydroxyamide derivatives or their oxyalkylene reaction products that comprise at least two hydroxyl groups and at least an amide group. These hydroxyamide derivatives are represented by the following formula (II):

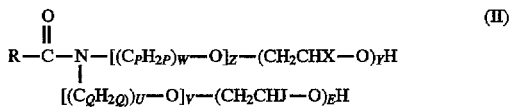

wherein R is independently selected from the group consisting of H, $C_nH_{2n+1}$, cyclic $C_nH_{2n-1}$, $C_6H_5$, $C_5H_4N$, substituted or unsubstituted aromatic groups and heterocyclic groups with carbon atoms from three to twenty, and $OC_nH_{2n+1}$, wherein n is from one to forty; characters J and X are independently selected from H and $C_kH_{2k+1}$ and k is from zero to twenty; P and Q are independently selected from two to twenty; U and W are independently selected from one to twenty; V and Z are independently from zero to forty; and E and Y are independently selected from zero to forty; Z+Y must be at least one or greater than one; V+E must be at least one or greater than one; and all characters P, Q, U, W, V, Z, E, Y, X, and J can be independently selected. In addition, the group $[(C_QH_{2Q})_U—O]_V$ and $[(C_pH_{2p})_w—O]_z$ can also be independently substituted by a phenoxy group ($C_6H_4O$—) or an alkylphenoxy group. The concentration of the above hydroxyamide derivatives in an ink jet ink can vary from 0.1 to 40% by weight of total ink weight, preferably from 1 to 30% by weight.

Inks of the present invention, in embodiments, may also comprise isomers of the aforementioned hydroxyamide derivatives, their reaction products with oxyalkylenes, and mixtures thereof. Condensation reaction of a hydroxyl group of a hydroxyamide derivative with an oxyalkylene or alkyleneoxide with or without a catalyst (e.g., acid or basic catalyst) is possible. The reaction products are new hydroxyamide derivatives, which are also included in the present invention.

In addition, inks of the present invention, in embodiments, may also comprise thiol derivatives (sulfur analogs) of all of the aforementioned hydroxyamide derivatives. Any oxygen atom of the aforementioned hydroxyamide derivatives (especially —OH and amide groups) including those in the Formula(I) and Formula(II) can be independently selected and substituted by a sulfur atom to give new useful materials in inks of this invention. For example, the oxygen atom of any hydroxyl group and amide group of the aforementioned hydroxyamides can be optionally substituted by a sulfur atom to give a mercaptoamide derivative (comprising at least a thiol (—SH) and an amide (—CO—N<) group in a compound) and a hydroxythioamide derivative (comprising at least a hydroxyl group and a thioamide (—CS—N<) group in a compound) respectively. Like the hydroxyl group (—OH) of the hydroxyamide derivatives, the thiol group (—SH) of the mercaptoamide derivatives can also react with oxyalkylenes (alkyleneoxides) and thioalkylenes (e.g. ethylenesulfide, propylenesulfide, etc.) to give products containing thiopolyoxyalkylene (e.g., —S—$(CH_2CH_2O)_a$—H, —S—$(CH_2CHCH_3O)_a$—H, wherein a is from one to forty), thiopolythioalkylene (e.g., —S—$(CH_2CH_2S)_b$—H, —S—$(CH_2CHCH_3S)_b$—H, wherein b is from one to forty) respectively, and mixed alkyleneoxide and alkylenesulfide (e.g., —S—$(CH_2CH_2O)_c$—$(CH_2CH_2S)_d$—H, wherein c and d are independently selected from one to forty. Likewise, hydroxythioamide (comprising —OH and —CS—N< groups) and thiolthioamide (mercaptothioamide comprising —SH and —CON< groups) derivatives can also react with oxyalkylene (alkylenoxide) and thioalkylene (alkylenesulfide) through either the hydroxyl group or the thiol group to give respective reaction products of oxyalkylene (alkyleneoxide) and thioalkylene (alkylenesulfide) comprising at least one thioamide (—CS—N<) group. The concentration of the above hydroxyamide derivatives in an ink jet ink can vary from 0.1 to 40% by weight of total ink weight and preferably from 1 to 30%.

All the aforementioned hydroxyamide derivatives (at least one hydroxyl group and one amide group), mercaptoamide derivatives (at least one thiol group and one amide group), hydroxythioamide derivatives (at least one hydroxyl group and one thioamide group), and mercaptothioamide derivatives (at least one thiol group and one thioamide group) can react with either oxyalkylene or thioalkylene at any stoichmetric ratio (e.g., 1/1, 1/2, 1/3, 2/1, 2/5, 2/3, 3/5, 1/6, N/N', and the like wherein N and N' can independently be any positive integer) to give new compounds. Each one of the new compounds comprises at least two functional groups which are selected from a hydroxyl group (—OH); a mercaptol group (—SH); an amide group (—CO<N); and a thioamide group (—CS<N) with the following combinations including (a) and (c), (a) and (d), (b) and (c), and (b) and (d).

The concentration of the hydroxyamides, mercaptoamides, hydroxythioamides, and mercaptothioamides of this invention when incorporated into an ink jet ink can be from 0.1 to 40 wt. % of total ink weight, preferably from 0.1 to 35 wt. % of total ink weight, and more preferably from 1 to 30 wt. % of total ink weight, although the amount can be outside of these ranges.

The ink jet ink compositions of the present invention do not evaporate quickly like water, thus providing long latency and are compatible with water soluble or miscible colorants including dyes and pigments (including stabilized pigments either with or without a dispersant). In addition, the hydroxyl, mercaptol, amide, and thioamide groups of the ink jet inks of this invention can interact with the hydroxyl groups of cellulose in a paper substrate and the hydroxyl and carbonyl groups of a transparency substrate, thereby resulting in possible reduction of cockle and curl of an imaged substrate.

In addition to the above-identified compounds which can act as humectants in ink jet inks of the present invention, the inks may further include additional humectants and/or co-solvents. When present, such additives may include any of the various known ink jet ink humectants and co-solvents, which include, but are not limited to, glycols, such as ethylene glycol, diethylene glycol, propylene glycol, dipropylene glycol, polyethylene glycols, polypropylene glycols, and the like; diols containing 2 to 40 carbon atoms such as 1,3-propanediol, 1,5-pentanediol, 1,6-hexanediol, and the like; triols, such as glycerine, trimethylolpropane, triols containing 3 to 40 carbon atoms with three hydroxyl groups, and the like; tetraols comprising 4 to 40 carbon atoms such as pentaerythritol, erythritol, and the like; internal salts such as betaine, sulfoxides, such as alkylsulfoxides, dialkylsulfoxides, and cyclic sulfoxides which include dimethylsulfoxide, diethylsulfoxide, methylbutylsulfoxide, alkylphenyl sulfoxides, and the like; sulfones, such as sulfolane (a cyclic sulfone also known as tetramethylene sulfone), dialkyl sulfones, alkyl phenyl sulfones and the like; amides, including 2-pyrrolidinone (2-pyrrolidone), N,N-dialkyl amides, N-alkyl-N-phenyl amides, N-methylpyrrolidinone, N-ethylpyrrolidinone, N-cyclohexylpyrrolidinone, N,N-diethyltoluamide, urea and the like; ethers, such as alkyl or phenyl ether derivatives of alcohol, diols, triols, and glycols including butylcarbitol®, triolethers, alkyl ethers of polyethyleneglycols, alkylphenyl ethers of polyethyleneglycols, alkyl ethers of polypropyleneglycols, alkylphenyl ethers of polypropyleneglycols, and the like; as well as thio (sulfur) derivatives of the aforementioned materials including, but not limited to, alkylmercaptan (alkylthiol derivatives), thioethyleneglycol, thiodiethyleneglycol, thiopropyleneglycol, thiodipropyleneglycol, thiopolyethyleneglycol, thiopolypropyleneglycol, dithio- or trithio-glycerine, and the like, their derivatives and mixtures thereof. Furthermore, the aforementioned diols, triols, tetraols, polyols, glycols and their condensation products with either oxyalkylene or thioalkylene can also be used and included in the ink jet inks of this invention. Any desired combination of the above mentioned humectants or solvents may be used in ink jet inks of this invention. For example, ink jet inks according to the present invention may also include sulfolane alone, sulfolane in combination with other co-solvents or humectants including those mentioned above, or one or more solvents or humectant without the sulfolane.

The ink jet ink of this invention may also contain a penetrant to accelerate ink drying and reduce inter-color bleeding. Penetrants suitable for use in the present invention include, but are not limited to, hydroxyethers, including alkyl cellusolves® and alkyl carbitols® such as hexyl carbitol® and butyl carbitol®; polyethyleneglycol ether derivatives (such as alkyl ethers including methyl, ethyl, propyl, butyl, pentyl, hexyl, dodecyl, lauryl, stearyl, ether derivatives, phenyl and alyklphenyl ether derivatives of polyethyleneglycols, and the like); and polypropyleneglycol ether derivatives (such as alkyl ethers including methyl, ethyl, propyl, butyl, pentyl, hexyl, dodecyl, lauryl, stearyl, ether derivatives, phenyl and alyklphenyl, ether derivatives of polpropyleneglycols, and the like); and the like; and mixtures thereof.

The ink jet inks of the present invention also comprise a colorant. The colorant for the ink jet inks of this invention can be selected from any of the suitable colorants known in the art which include an Anionic (Acid Dyes) or a Cationic Dye (e.g., Basic Dyes), or a Direct Dye, or a Reactive Dye, a pigment(including carbon blacks), and their suitable mixtures thereof. The colorants may be present either with or without a dispersing agent. The pigment can also be a grafted or chemically modified pigment which comprises at least a water compatible or ionizable group (e.g., carboxylic acid, sulfonic acid, phosphorous acid, phosphoric acid group, and the like, as well as their salts).

In embodiments of the present invention where dyes are used, the dye is present in the ink jet ink composition in any effective amount to provide a desired color. Typically the dye is present in an amount of from about 0.1 to about 15% by weight of total ink weight, and preferably from about 0.5% to about 10% by total ink weight, although the amount can be outside this range. A mixture of dyes in the proportions desired to obtain a specific shade may also be employed (for example, a mixture of cyan and yellow dyes, a mixture of cyan and magenta dyes, a mixture of magenta and yellow dyes, a mixture of two different dyes consisting of cyan, magenta, yellow, and black in any combination). Similarly, in embodiments of the present invention where pigments are used, the pigment may be present in the ink jet ink composition in any effective amount either with or without the presence of a dye. Typically the pigment is present in an amount of from about 0.1% to about 15% by weight of total ink and preferably from about 0.5% to about 10% by weight of total ink weight, although the amount can be outside of this range. Where both dyes and pigments are incorporated into the ink jet ink composition, the weight percentage of the combined colorant may be adjusted accordingly.

The ink jet ink compositions of this invention can comprise a colorant such as water soluble or miscible dyes including Anionic and Cationic Dyes. Those dyes can be Basic, Acidic, Direct, and Reactive Dyes. Examples of suitable dyes include, but are not limited to, Food Black No. 1, Food Black No. 2, Food Red No. 40, Food Blue No. 1, Food Yellow No. 7, and the like; various FD & C dyes; Acid Black dyes (No. 1, 7, 9, 24, 26, 48, 52, 58, 60, 61, 63, 92, 107, 109, 118, 119, 131, 140, 155, 156, 172, 194, and the like); Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like); Acid Yellow dyes (No. 3, 7, 17, 19, 23, 25, 29, 38, 42, 49, 59, 61, 72, 73, 114, 128, 151, and the like); Direct Black dyes (No. 4, 14, 17, 22, 27, 38, 51, 112, 117, 154, 168, and the like); Direct Blue dyes (No. 1, 6, 8, 14, 15, 25, 71, 76, 78, 80, 86, 90, 106, 108, 123, 163, 165, 199, 226, and the like); Direct Red dyes (No. 1, 2, 16, 23, 24, 28, 39, 62, 72, 236, and the like); Direct Yellow dyes (No. 4, 11, 12, 27, 28, 33, 34, 39, 50, 58, 86, 100, 106, 107, 118, 127, 132, 142, 157, and the like); anthraquinone dyes, monoazo dyes, disazo dyes, phthalocyanine derivatives, including various phthalocyanine sulfonate and ammonium salts, aza annulenes, formazan copper complexes, triphenodioxazines, Bernacid Red 2BMN; Pontamine Brilliant Bond Blue A; Pontamine; Cibracron Brilliant Red 38-A (Reactive Red 4), available from Aldrich Chemical Co.; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Direct Brilliant Pink B Ground Crude, available from Crompton & Knowles Co.; Cartasol Yellow GTF Presscake, available from Sandoz Inc.; Cartasol Yellow GTF Liquid Special 110, available from Sandoz Inc.; Yellow Shade 16948, available from Tricon Co., Basacid Black X34, available from BASF Co., Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Concentrate A (Morton-Thiokol); Special Black dyes (from Mobay Co.); Black S-SF Liquid VP2162 (Hoechst and Celanese); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-175; BASF Basacid Black SE 0228; various Reactive dyes, including Reactive Black dyes, Reactive Blue dyes, Reactive Red dyes, Reactive Yellow dyes, and the like, as well as mixtures thereof.

The pigment can be black, cyan, magenta, yellow, red, blue, green, brown, and the like, as well as mixtures thereof. Examples of suitable pigments include, but are not limited to, various carbon blacks such as channel black, furnace black, lamp black, Raven® 5250, Raven® 5750, Raven® 3500 and other similar carbon black products available from Columbia Company, Regal® 330, Black Pearl® L, Black Pearl® 1300, and other similar carbon black products available from Cabot Company, Degussa carbon blacks such as Color Black® series, Special Black® series, Printtex® series and Derussol® carbon black dispersions available from Degussa Company, Levanyl® carbon black dispersions from Bayer Co., Hostafine® series such as Hostafine® Yellow GR (Pigment 13), Hostafine(r) Yellow (Pigment 83), Hostafine® Red FRLL (Pigment Red 9), Hostaline® Rubine F6B (Pigment 184), Hostafine® Blue 2G (Pigment Blue 15:3), Hostafine® Black T (Pigment Black 7), and Hostafine® Black TS (Pigment Black 7), as well as Novofil Black BBO3 carbon black dispersion available from Hoechst Celanese Corporation. Normandy Magenta RD-2400 (Paul Uhlich), Paliogen® Violet 5100 (BASF), Paliogen® Violet 5890 (BASF), Permanent Violet VT2645 (Paul Uhlich), Heliogen® Green L8730 (BASF), Argyle Green XP-111-S (Paul Uhlich), Brilliant Green Toner GR 0991 (Paul Uhlich), Heliogen® Blue L6900, L7020 (BASF), Heliogen Blue D6840, D7080 (BASF), Sudan® Blue OS (BASF), PV Fast Blue B2G01 (American Hoechst), Irgalite Blue BCA (Ciba-Geigy), Paliogen® Blue 6470 (BASF), Sudan® III (Matheson, Coleman, Bell), Sudan II (Matheson, Coleman, Bell), Sudan® IV (Matheson, Coleman, Bell), Sudan Orange G (Aldrich), Sudan® Orange 220 (BASF), Paliogen® Orange 3040 (BASF), Ortho Orange OR 2673 (Paul Uhlich), Paliogen® Yellow 152, 1560 (BASF), Lithol Fast Yellow 0991K (BASF), Paliotol Yellow 1840 (BASF), Novoperm Yellow FG 1 (Hoechst and Celanese), Permanent Yellow YE 0305 (Paul Uhlich), Lumogen Yellow D0790 (BASF), Suco-Gelb L1250 (BASF), Suco-Yellow D1355 (BASF), Hostaperm® Pink E (Hoechst and Celanese), Fanal® Pink D4830 (BASF), Cinquasia Magenta (DuPont), Lithol Scarlet D3700 (BASF), Toluidine Red (Aldrich Chemical Co.), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen® Red 3871K (BASF), Paliogen® Red 3340 (BASF), Lithol Fast Scarlet L4300 (BASF), and the like as well as their mixtures thereof. Other suitable pigments can also be used.

The preferred pigments for the ink jet inks of the present invention are nontoxic and AMES test negative materials that include nonmutagenic and noncarcinogenic pigments for safety reasons. For example, it is desired to have pigments, including carbon blacks and color pigments, that have a very low concentration of polyaromatic hydrocarbons, which are known to be carcinogenic or mutagenic. For illustrative purposes, nitropyrene, pyrene, tetracene, pentacene, and other polyaromatic hydrocarbons in many commercial carbon blacks and color pigments are considered to be toxic at a concentration greater than 5 parts per million. Thus, it is desirable to limit the amount of such toxic polyaromatic hydrocarbons in the pigments to less than 5 parts per million for the preparation of nontoxic ink jet inks. Many commercial carbon blacks and colored pigments have a concentration of polyaromatic hydrocarbons exceeding 5 part per million and, therefore, the inks derived from such pigments are generally considered to be toxic or failing to pass the AMES test. However, many nontoxic carbon blacks and color pigments including Regal® 330, Black Pearl® 1300, Black Pearls® L, Raven® 5250, Raven® 5750, Vulcan® XC-7, Hostapern® pink E, Hostaperm® blue (a phthalocyanine derivative) and other pigments are generally used in toners and other imaging applications. Those carbon blacks and color pigments usually have a polyaromatic hydrocarbon content of less than 5 part per million. They do not show positive response in the AMES test (a test for mutagenicity) and are considered to be relatively safe in toner and in ink jet ink applications.

Preferably, the pigment particle size of ink jet inks of this invention is as small as possible to enable a stable colloidal suspension of the particles in the liquid vehicle with good color strength and to prevent clogging of the ink channels or nozzle openings when the ink is used in a thermal ink jet printer. Preferred average particle sizes are generally from about 0.001 to about 3 microns, although the particle size can be outside this ranges in embodiments. A more preferred average pigment particle size in the inks of this invention includes particles having at least 50% of the particles being below 0.3 micron with no particles being greater than 3.0 micron (measured on a Hodaka CAPA 700 Particle Size Analyzer). More preferably, the pigment particle size includes particles having at least 70% of the particles being below 0.3 micron with no particles being greater than 1.0–1.2 micron although the average particle size can be outside of this range.

In embodiments of the present invention, the pigment may be dispersed in the ink with one or more dispersants. The dispersants can be anionic, cationic, and nonionic types. Some of the preferred dispersants are ionic dispersants that have both ionic (hydrophilic type which is capable of ionization in water) and hydrophobic (affinity for pigments) moieties. Suitable dispersants include, but are not limited to, anionic dispersants, such as polymers and copolymers of styrene sulfonate salts (such as Na+, Li+, K+, Cs+, Rb+, substituted and unsubstituted ammonium cations, and the like) or naphthalene sulfonate salts, (such as Na+, Li+, K+, Cs+, Rb+, substituted and unsubstituted ammonium cations, and the like), unsubstituted and substituted (e.g., alkyl, alkoxy, substituted naphthalene derivatives, and the like) naphthalene sulfonate salts (such as Na+, Li+, K+, Cs+, Rb+, substituted and unsubstituted ammonium cations, and the like) and an aldehyde derivative (such as unsubstituted alkyl aldehyde derivatives including formaldehyde, acetaldehyde, propylaldehyde, and the like), acrylic acid salts, methacrylic acid salts, maleic acid salts, mixtures thereof, and the like. They can be either in solid form or water solutions. Examples of such dispersants include, but are not limited to, commercial products such as Versa® 4, Versa® 7, Versa® 77 (National Starch and Chemical Co.); Lomar® D (Diamond Shamrock Chemicals Co.); Daxad® 19, Daxad® K (W. R. Grace Co.); Tamol® SN (Rohm & Haas); and the like. Some preferred dispersants comprise naphthalene sulfonate salts, especially a condensation product of naphthalenesulfonic acid or its salts (such as Na+, Li+, K+, Cs+, Rb+, substituted and unsubstituted ammonium cations, and the like) and formaldehyde, as well as copolymers of various acrylic acid salts, or methacrylic acid salts. Also, nonionic dispersants or surfactants can be used in ink jet inks of the present invention, such as ethoxylated monoalkyl or dialkyl phenols including Igepal® CA and CO series materials (Rhone-Poulenc Co.), Briji® Series materials (ICI Americas, Inc.), and Triton® series materials (Union Carbide Company). These nonionic surfactants or dispersants can be used alone or in combination with the aforementioned anionic and cationic dispersants.

The ratio of pigment to aforementioned pigment dispersant(s) according to the present invention ranges from about 1/0.01 to about 1/3, preferably from about 1/0.1 to about 1/2, and most preferably from about 1/0.15 to about 1/1.5, although it can be outside of this range. The ratio of naphthalene substituent to aldehyde (e.g., formaldehyde, acetaldehyde) in the aforementioned anionic dispersant condensation product is generally about 1:1, although this ratio can be different depending on the stoichiometry of the feed stock and reaction condition, and can readily be adjusted to obtain a dispersant having a desired molecular weight and the desired ratio of naphthalene substituent to aldehyde. The remainder of the dispersant may comprise inactive ingredients such as water, solvent or humectant. The weight-average molecular weight of the dispersant is generally less than 20,000, preferably less than 13,000, and more preferably less than 10,000. The pigment dispersion should contain enough dispersant to stabilize the pigment particle dispersion, but not so much as to adversely affect properties of the dispersion such as viscosity, stability, and optical density.

The ink jet inks of the present invention may optionally include a water soluble or miscible microwave coupler in addition to the aforementioned hydroxyamide derivatives and their isomers which can also be effectively coupled with the microwave. The microwave coupler can be selected from any of the known microwave couplers, and can be an organic or inorganic salt or a nonionic microwave coupling agent that allows an ink to be dried quickly by a microwave heating device. Examples of such salts include, but are not limited to, monovalent ammonium salts and metal salts including ammonium bromide, ammonium chloride, ammonium iodide, ammonium formate, ammonium acetate, ammonium propionate, sodium chloride, potassium chloride, sodium bromide, potassium bromide, and the like, as well as various multi-valent metal salts (e.g. $Ca^{++}$, $Zn^{++}$, $Mg^{++}$, $Fe^{+++}$, $Mn^{++}$, $Al^{+++}$, $Ce^{++++}$, and the like) of organic and inorganic acids.

The ink jet inks of the present invention may optionally include a jetting aid such as polyethyleneoxide or a stabilized pigment particle with a concentration less than 0.1 wt % of total ink weight as described in a U.S Pat. No. 5,531,818 issued to Lin and Richards, the disclosure of which is entirely incorporated herein by reference. The polyethyleneoxide jetting aid is preferred the one having a weight-average molecular weight of about 18,500. The jetting aid provides smooth jetting or jetting with low jitters and good bubble formation with large drop mass and high ink velocity.

Other desired chemical additives including surfactants, water soluble polymers, pH buffers, biocides, chelating agents (EDTA and the like), anti-curl and anti-cockle agents, anti-intercolor bleeding agents, and other optional additives can also be optionally used in inks of this invention. Such additives can generally be added to ink jet inks of the present invention in known amounts for their known purpose.

Surfactants or wetting agents can be added to the ink jet inks. These additives may be of the anionic, cationic, and nonionic types. Suitable surfactants and wetting agents include, but are not limited to, Tamol SN®, Tamol LG®, and those of the Triton® series (Rohm and Haas Co.); those of the Marasperse® series; those of the Igepal® series (Rhone-Poulenc Co., formerly from GAF Co.); those of the Briji® Series including Briji® 30, Briji® 35, Briji® 52, Briji® 56, Briji® 58, Briji® 72, Briji® 76, Briji® 78, Briji® 92, Briji® 96, and Briji® 98; those of Surfynol® Series (Air Product Co.); those of the Tergitol® series and those of the Duponol® series (E. I. Du Pont de Nemours & Co.); Emulphor® ON 870 and ON 877 (GAF); and various other commercially available surfactants. These surfactants and wetting agents may be present in the inks in an effective amounts, generally from 0.0001 to about 10 percent by weight of total ink weight, and preferably from about 0.001 to about 10 percent by weight of total ink weight, and more preferably from about 0.001 to about 5 percent by weight of total ink weight, although the amount can be outside these ranges.

Polymeric chemical additives can also be added to the ink jet inks of the present invention to adjust the viscosity of the ink. Suitable polymeric additives include, but are not limited to, water soluble polymers and copolymers such as Gum Arabic, polyacrylate salts, polymethacrylate salts, polyvinyl alcohols, hydroxypropylcellulose, hydroxyethylcellulose, polyvinylpyrrolidinone, polyvinylether, starch, polysaccharides, polyethyleneimines with or without being derivatized with ethylene oxide and propylene oxide including the Discole® series (DKS International); the Jeffamine® series (Texaco); and the like. Polymeric additives may be present in the ink jet inks of the present invention in amounts of from 0 to about 10 percent by weight of total ink weight, preferably from about 0.001 to about 8 percent by weight of total ink weight, and more preferably from about 0.01 to about 5 percent by weight of total ink weight, although the amount can be outside these ranges.

Other optional chemical additives (ink additives) for the ink jet inks of the present invention include biocides such as Dowicil® 150, 200, and 75, benzoate salts, sorbate salts, Proxcel® (available from ICI), and the like. When used, such biocides are generally present in an amount of from 0 to about 10 percent by weight of total ink weight, preferably from about 0.001 to about 8 percent by weight of total ink weight, and more preferably from about 0.01 to about 4.0 percent by weight of total ink weight, although the amount can be outside these ranges.

Ink jet inks of the present invention may also include pH controlling agents. Suitable pH controlling agents include, but are not limited to, acids, bases, phosphate salts, carboxylate salts, sulfite salts, amine salts, and the like. When used, such pH controlling agents are generally present in an amount of from 0 to about 10 percent by weight of total ink weight, preferably from about 0.001 to about 5 percent by weight of total ink weight, and more preferably from about 0.01 to about 5 percent by weight of total ink weight, although the amount can be outside these ranges.

Other suitable chemical additives are chelating agents which include, but are not limited to, ethylenediamine N,N'-diacetic acid, ethylenediamine tetraacetic acid (EDTA), ethylenediamine triacetic acid, and their metal salts including those of sodium, potassium, magnesium, calcium, zinc, and iron salts. They are in the inks in a concentration from 0 to 8 wt. % of total ink weight.

The ink jet inks of the present invention may be applied to a suitable substrate in an image-wise fashion. Application of the ink to the substrate can be made by any suitable printing process compatible with aqueous-based inks, such as flexographic printing, pen plotters, continuous stream ink jet printing, drop-on-demand ink jet printing (including piezoelectric, acoustic and thermal ink jet processes), and the like. The ink jet inks of this invention can be printed on a print substrate either with or without heat. The heat can be selectively applied onto a print substrate such as a paper and an ink jet transparency at any stage of ink jet printing process including before, during, and after printing as well as combinations thereof. The heating means can be radiant heating, heated plate, heated roller, heated drum, microwave drying device, heating lamp, light, and hot air. The print substrate employed can be any substrate compatible with aqueous-based inks, including plain papers, copier papers such as Xerox® series 10 paper, Xerox® 4024 paper, commercial bond papers and the like; coated papers (or special ink jet papers including those silica treated paper), such as those available from Hewlett-Packard Co., Canon Co., Oji Paper Co., and Xerox Corporation; ink jet transparency materials suitable for aqueous inks or ink jet printing processes, including those from Artright Co., Hewlett-Packard Co., Canon Co., and Xerox Corporation; and the like.

There are many advantages of using the hydroxyamides, mercaptoamides, thioamides, and mercaptothioamides of the present invention in ink jet inks. In particular, they can be used in dye and pigment based aqueous inks to reduce paper curl; they are of low cost; they are compatible with many known humectants and ink jet ink ingredients and chemical additives; they are readily soluble or miscible in water; they have high boiling points and low vapor pressures; and they are suitable for imaging processes employing heat and delay techniques. The useful inks of the present invention also minimize dye crystallization and pigment precipitation or agglomeration, thus aiding in reducing clogging or plugging of ink jet nozzles. The ink jet inks of the present invention possess excellent latency. Generally, the inks demonstrate latency of ten seconds or more at a relative humidity (RH) of 15% when a high resolution printhead (600 spi printhead) is employed.

The following Examples illustrate specific embodiments of the invention. These Examples are intended to be illustrative only, and the invention is not limited to the materials, conditions or process parameters set forth in the Examples. All parts and percentages are by weight of the total weight of an ink unless otherwise indicated.

EXAMPLES

Comparative Example I

An ink jet ink was prepared with the following composition: BASF X-34 black dye (17.3% of the concentrated dye solution, which contains 30% dye), ethyleneglycol (20%), polyethyleneoxide (MW=18,500, 0.075%), Dowicil 200 (0.1%) and water (balance).

The ingredients were thoroughly mixed to give a homogeneous mixture and the pH of the ink was adjusted to 7.0. The ink was filtered through a series of filters 3.0 mm/1.2 mm under pressure.

Comparative Example II

An ink jet ink was prepared with the following composition: BASF X-34 black dye (11.5% of the concentrated dye solution which contains 30% dye), ethyleneglycol (20%), polyethyleneoxide (MW=18,500, 0.075%), Dowicil 200 (0.1%) and water (balance).

The ingredients were thoroughly mixed to give a homogeneous mixture and the pH of the ink was adjusted to 7.0. The ink was filtered through a series of filters 3.0 mm/1.2 mm under pressure.

Comparative Example III

A commercial ink jet ink (Hewlett Packard HP 1200C Cyan Ink) for 300 spi printing was used as a reference for latency tests using a Xerox 600 spi printhead.

Comparative Example IV

A commercial ink jet ink (Hewlett Packard HP 1200C Black Ink) for 300 spi printing was used as a reference for latency test using a Xerox 600 spi printhead.

The above ink samples (Comparative Examples from I to IV) were prepared as Reference ink Samples for comparison purpose.

Example I

An ink jet ink was prepared with the following composition: Acid Blue 9 dye (1.96%), Butylcarbitol (1.96%), 1-cyclohexyl-2-pyrrolidinone (2.0%), sulfolane (9.8%), N-acetylethanolamine (a hydroxyamide, 9.8%), polyethyleneoxide (MW=18,500, 0.074%), Dowicil 200 (0.049%), and water (balance).

The ingredients were thoroughly mixed to give a homogeneous mixture and the pH of the ink was adjusted to 7.0. The ink was filtered through a series of filters 3.0 mm/1.2 mm under pressure.

Example II

An ink jet ink was prepared with the following composition: Project Cyan dye (35.0% of 10.0% dye concentration; corresponding to 2.309% pure dye), Lomar D (0.5%, an anionic dispersing agent), Butylcarbitol (8.0%), 1-cyclohexyl-2-pyrrolidinone (2.0%), Glycerol propoxylate (1 propyleneoxide per hydroxyl group, 4.0%), sulfolane (4.0%), N-acetylethanolamine (a hydroxyamide, 12.0%), polyethyleneoxide (Ave. MW=18,500, 0.05%), Dowicil 200 (0.05%), Igepal CA-630 (a nonionic surfactant, 0.1%), and water (balance).

The ingredients were thoroughly mixed to give a homogeneous mixture and the pH of the ink was adjusted to 7.0.

The ink was filtered through a series of filters 3.0 mm/1.2 mm under pressure.

Example III

An ink jet ink was prepared with the following composition: Project magenta dye (23.295% of 10.0% dye concentration; corresponding to 2.329% pure dye), Acid Red 52 (5.591%), Butylcarbitol (9.318%), 1-cyclohexyl-2-pyrrolidinone (1.864%), sulfolane (13.977%), N-acetylethanolamine (a hydroxyamide, 4.908%), polyethyleneoxide (Ave. MW=18,500, 0.047%), Dowicil 200 (0.047%), Ammonium Bromide (1.905%), and water (balance).

The ingredients were thoroughly mixed to give a homogeneous mixture and the pH of the ink was adjusted to 7.0. The ink was filtered through a series of filters 3.0 mm/1.2 mm under pressure.

Example IV

An ink jet ink was prepared with the following composition: Project magenta dye (23.295% of 10.0% concentrated dye solution; corresponding to 2.329% pure dye), Acid Red 52 (5.591%), Butylcarbitol (9.318%), 1-cyclohexyl-2-pyrrolidinone (1.864%), sulfolane (13.977%),1-(2-hydroxyethyl)-2-pyrrolidinone (a cyclic hydroxyamide, 4.918%), polyethyleneoxide (Ave. MW=18,500, 0.047%), Dowicil 200 (0.047%), Ammonium Bromide (1.905%), and water (balance).

The ingredients were thoroughly mixed to give a homogeneous mixture and the pH of the ink was adjusted to 7.0. The ink was filtered through a series of filters 3.0 mm/1.2 mm under pressure.

Example V

An ink jet ink was prepared with the following composition: Project yellow dye (25.159% of 7.5% concentrated dye solution; corresponding to 1.885% pure dye), Acid yellow 17 dye (18.636% of 10% concentrated dye solution, corresponding to 1.864% pure dye), Butylcarbitol (9.318%), 1-cyclohexyl-2-pyrrolidinone (1.864%), sulfolane (13.977%), N-acetylethanolamine (a hydroxyamide, 4.908%), polyethyleneoxide (Ave. MW=18,500, 0.047%), Dowicil 200 (0.047%), Ammonium Bromide (1.905%), and water (balance).

The ink ingredients were thoroughly mixed to give a homogeneous mixture and the pH of the ink was adjusted to 7.0. The ink was filtered through a series of filters 3.0 mm/1.2 mm under pressure.

Comparative Examples I–IV and Examples I–V were tested for latency at 15% relative humidity (RH) using a Xerox 600 spi printhead with 384 nozzles and the nozzle openings are less than 25 mm. The printhead was operated in the range of 37 to 39 volts. The latency data for the high resolution ink jet printing (600 spi resolution) are shown in Table I. The jetting frequency response for an ink to be printed smoothly (transit time is less than 0.5% deviation from the statistical mean, low jitters) was also measured. The latency and frequency response data are also shown in Table I.

TABLE I

Latency and Frequency Response Data For Ink Jet Inks With a 600 SPI Printhead

| Ink | Color | Latency |
| --- | --- | --- |
| Comparative Example I | Black | 5 sec. |
| Comparative Example II | Black | 10 sec. |
| Comparative Example III | Cyan | 10 sec. |
| Comparative Example IV | Black | 5 sec. |
| Example I | Cyan | >50 sec., 8 KHz |
| Example II | Cyan | 50 sec., 6 KHz |
| Example III | Magenta | 200 sec., 4 KHz |
| Example IV | Magenta | 100 sec., 4 KHz |
| Example V | Yellow | 50 sec., 4 KHz |

The following ink jet inks were prepared for the evaluation of paper curl. A Hewlett Packard HP 1200C printer was used to print a large solid area 8"×10¼" with about ¼" border on each side (left, right, and top) and about ½" for the bottom. The high quality printing mode is used and the print substrate was heated before and during printing. The printing was done in a checkerboarding method in which the printhead moves across the paper many times to produce the solid area. Printing was also carried out without using heat (1) in a checkerboarding method or single pass method and (2) in a fast speed printing method (at least 18 pages per minute) using a full-width array printhead (600 spi high resolution printing).

After printing the solid area, the printed samples were placed flatly in trays with image side facing upward. The imaged papers comprising a large solid area were allowed to dry under ambient condition for at least one day and up to one month or longer. After drying, the heights of four corners (corner heights in cm) of each paper were measured and the average were recorded. Small corner height of a printed sample indicates a low degree of curl.

Several plain papers were used including the following set of papers: Xerox 4200 (Champion Pensacola, 1T), Xerox 4200 (GP Ashdown, 2T), Xerox Recycled DP (Domtar Cornwall, 3T), Hammermill Tidal DP (Oswego, 4T), Union Camp Jamestown DP (Franklin, 5T), Springhill Relay DP (Triconderoga, 6T), Xerox Image Series LX (Ashdown 24 #, 7T), Hammermill 16 # (8T), and Xerox Image Series 32 # (Ashdown, 9T) and Set No. 2: Xerox Recycled DP (Domtar Cornwall, 3T), Xerox Image Series LX (Ashdown 24 #, 7T), Hammermill Tidal DP (International paper, 10T), Xerox 4024 DP (Union Camp, 11T), Rank Xerox Premier ECF $3R_{91781}$ (Modo, 12T), Rank Xerox Premier TCF $3R_{91805}$ (Nymolla, 13T), Champion (Moji-Guacu, 14T), Rank Xerox Business $3R_{91820}$ (Aussedat-Rey, 15T), Rank Xerox Exclusive $3R_{90208}$ (Iridium, 16T), Rank Xerox Premier TCF $3R_{90208}$ (Nymolla, 17T), Xerox 4024 (Champion Cortland, 18T), Cascade Xerographic paper (Boise Cascade, 19T), Spectrum DP (Georgia Pacific, 20T), Husky Xerocopy (Weyerhauser, 21T), Xerox Image Elite (Kimberly Clark, 22T), and Fuji Xerox paper (23T).

Comparative Example V

An ink jet ink was prepared with the following composition: Acid yellow 17 (20% concentrated dye solution, which contains 10% dye, Tricon), Project yellow 1G (27% of concentrated dye solution, which contains 7.5% dye, Zeneca), sulfolane (15.46%), butylcarbitol (10%), 1-cyclohexyl-2-pyrrolidinone (2.0%), Tris(hydroxymethyl) aminomethane (0.5%), Ethylenediaminetetraacetic acid (EDTA, 0.35%), polyethyleneoxide (Ave. MW=18,500, 0.03%), Dowicil 200 (0.05%), and water (balance).

Example VI

An ink jet ink was prepared with the following composition: Acid blue 9 (2.0%), 2-(2-n-butoxyethoxy)ethanol (butylcarbitol, 2.0%), sulfolane (10.0%), N-acetylethanolamine (a hydroxyamide, 10.0%), polyethyleneoxide (Ave. MW=18,500, 0.075%), Dowicil 200 (0.05%), and water (balance).

Example VII

An ink jet ink was prepared with the following compositions: Project cyan dye (35.0% of concentrated dye solution, which contains 10% dye), Lomar D (a dispersing agent, 0.45%), 1-cyclohexyl-2-pyrrolidinone (2.0%), 2-(2-n-butoxyethoxy)ethanol (butylcarbitol, 4.0%), glycerol (9.0%), N-acetylethanolamine (a hydroxyamide, 8.0%), polyethyleneoxide (Ave. MW=18,500, 0.05%), Dowicil 200 (0.05%), Igepal CA-630 (0.1%), and water (balance).

Comparative Example VI

An ink jet ink was prepared with the following composition: Acid blue 9 (1.96%), 2-(2-n-butoxyethoxy)ethanol (butylcarbitol, 1.96%), sulfolane (9.8%), 1-cyclohexyl-2-pyrrolidinone (2.0%), polyethyleneglycol Ave. MW=200 (9.8%), polyethyleneoxide (Ave. MW=18,500, 0.074%), Dowicil 200 (0.049%), and water (balance).

In Table II, the curl data of the average corner heights of printed samples are listed. The curl data were obtained after printing and drying for seven days under ambient laboratory condition. Examples VI and VII show reduced paper curl and cockle as compared to the Comparative Examples V and VI (Reference Inks).

TABLE II

Paper Curl Data of Various Inks

| Paper Type | Comparative Example V Avg. Corner Height (cm) | Example VI Avg. Corner Height (cm) | Example VII Avg. Corner Height (cm) | Comparative Example VI Avg. Corner Height (cm) |
| --- | --- | --- | --- | --- |
| 1T | 0.78 | 0.0 | 0.0 | 0.0 |
| 2T | 2.50 | 0.0 | 0.2 | 0.2 |
| 3T | 3.00 | 0.08 | 0.2 | 0.78 |
| 4T | 3.95 | 1.15 | 0.65 | 2.7 |
| 5T | 3.00 | 0.10 | 0.18 | 0.10 |
| 6T | 3.15 | 0.85 | 0.45 | 1.55 |
| 7T | 1.70 | 0.20 | 0.23 | 0.60 |
| 8T | Very bad; formed a tube | 0.75 | 0.40 | 1.98 |
| 9T | 1.05 | 0.0 | 0.05 | 0.10 |
| Average | >2.39 | 0.35 | 0.26 | 0.91 |

Example VIII

A pigment-based ink jet ink was prepared with the following composition: Carbon black (5% carbon black pigment, 64.140 g processed Lavanyl carbon black dispersion (VK60527)), Sulfolane (10.0%, 20.0 g), N-acetylethanolamine (17.0%, 34.0 g), and water (balance). The carbon black ink was centrifuged and filtered through a series of membrane filters 5.0 mm/3.0 mm/1.2 mm. The ink was placed into an empty HP 1200C carbon black cartridge and printed onto various plain papers with a HP 1200C printer using the high quality mode. Good print quality was obtained with reduced curl and cockle.

What is claimed is:

1. An ink jet ink composition suitable for high resolution ink jet printing comprises:

water;

a colorant selected from the group consisting of a dye, a pigment, and a mixture of a dye and pigment; and a material selected from the group consisting of a hydroxyamide derivative having at least one hydroxyl group and at least one amide group; a mercaptoamide derivative having at least one mercaptol group and at least one amide group; a hydroxythioamide derivative having at least one hydroxyl group and at least one thioamide group; a mercaptothioamide derivative having at least one mercaptol group and at least one thioamide group; an oxyalkylene reaction product of said derivatives; a thioalkylene reaction product of said derivatives; and mixtures thereof, wherein said hydroxyamide derivative is represented by the following formula:

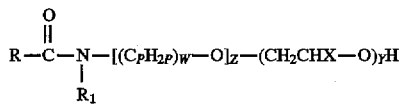

wherein,

R is independently selected from the group consisting of $C_nH_{2n+1}$, Cyclic $C_nH_{2n-1}$, $C_6H_5$, $C_5H_4N$, substituted or unsubstituted aromatic groups and heterocyclic groups with carbon atoms from three to twenty, and $OC_nH_{2n+1}$ wherein n is from one to forty;

$R_1$ is independently selected from the group consisting of $C_mH_{2m+1}$, cyclic $C_mH_{2m-1}$, $C_6H_5$, $C_5H_4N$, polethyleneglycoxyphenyl, polpropyleneglycoxyphenyl, poly(ethylene-co-propylene)glycoxyphenyl, and substituted and unsubstituted aromatic groups and heterocyclic groups with from three to twenty carbon atoms, wherein m is from one to forty; and X is independently selected from H and $C_kH_{2k+1}$ wherein k is from zero to twenty; P is from two to twenty; W is from one to twenty; Y is from zero to forty; Z is from zero to forty; and Z+Y must be one or greater than one.

2. An ink jet ink composition according to claim 1, wherein at least one oxygen atom of the said hydroxyamide derivative is replaced by a sulfur atom.

3. An ink jet ink composition according to claim 1, wherein the said hydroxyamide derivative has a concentration from 0.1 to 40% by weight in the ink and is selected from the group consisting of N-butyl-N-(2-hydroxyethyl) butyric acid amide; N-propyl-N-(2-hydroxyethyl)butyric acid amide; N-ethyl-N-(2-hydroxyethyl)butyric acid amide; N-methyl-N-(2-hydroxyethyl)butyric acid amide; N-(2-hydroxyethyl)butyric acid amide; N-butyl-N-(2-hydroxyethyl)propionic acid amide; N-propyl-N-(2-hydroxyethyl)propionic acid amide; N-ethyl-N-(2-hydroxyethyl)propionic acid amide; N-methyl-N-(2-hydroxyethyl)propionic acid amide; N-(2-hydroxyethyl) propionic acid amide; N-butyl-N-(3-hydroxypropyl)butyric acid amide; N-propyl-N-(3-hydroxypropyl)butyric acid amide; N-ethyl-N-(3-hydroxypropyl)butyric acid amide; N-methyl-N-(3-hydroxypropyl)butyric acid amide; N-(3-hydroxypropyl)butyric acid amide; N-butyl-N-(3- hydroxypropyl)propionic acid amide; N-propyl-N-(3-hydroxypropyl)propionic acid amide; N-ethyl-N-(3-hydroxypropyl)propionic acid amide; N-methyl-N-(3-hydroxypropyl)propionic acid amide; N-(3-hydroxypropyl) propionic acid amide; N-butyl-N-acetylethanolamine (N-butyl-N-(2-hydroxyethyl)acetic acid amide); N-propyl-N-acetylethanolamine (N-propyl-N-(2-hydroxyethyl)acetic acid amide); N-ethyl-N-acetylethanolamine(N-ethyl-N-(2-hydroxyethyl)acetic acid amide); N-methyl-N-acetylethanolamine (N-methyl-N-(2-hydroxyethyl)acetic acid amide); N-acetylethanolamine (N-(2-hydroxyethyl) acetic acid amide); N-acetylpropanolamine (N-(3-hydroxypropyl)acetic acid amide); N-methyl-N-acetylpropanolamine (N-methyl-N-(3-hydroxypropyl)acetic acid amide); N-ethyl-N-acetylpropanolamine (N-ethyl-N-(3-hydroxypropyl)acetic acid amide); N-propyl-N-acetylpropanolamine (N-propyl-N-(3-hydroxypropyl)acetic acid amide); N-butyl-N-acetylpropanolamine (N-butyl-N-(3-hydroxypropyl)acetic acid amide); N-acetylbutanolamine (N-(4-hydroxbutyl)acetic acid amide); N-methyl-N-acetylbutanolamine (N-methyl-N-(4-hydroxybutyl)acetic acid amide); N-ethyl-N-acetylbutanolamine (N-ethyl-N-(4-hydroxybutyl)acetic acid amide); N-propyl-N-acetylbutanolamine (N-propyl-N-(4-hydroxybutyl)acetic acid amide); N-butyl-N-acetylbutylamine (N-butyl-N-(4-hydroxybutyl)acetic acid amide); N-acetyl-N-benzyl-2-ethanolamine (N-benzyl-N-(2-hydroxyethyl)acetic acid amide); N-acetyl-N-imidazoyl-2-ethanolamine (N-imidazoyl-N-(2-hydroxyethyl)acetic acid amide; N-acetyl-N-4-pyridyl-2-ethanolamine (N-pyridyl-N-(2-hydroxyethyl)acetic acid amide); isomers of the aforementioned derivatives; and mixtures thereof.

4. An ink jet ink composition according to claim 1, wherein said material is present in a concentration from 0.1 to 40% by weight.

5. An ink jet ink composition according to claim 1, wherein the said oxyalkylene reaction product is selected from the group consisting of N-acetyl-N-(2-hydroxypolyethyleneoxy)ethylamine; N-acetyl-2-(hydroxypolypropyeneoxy)ethylamine; N-acetyl-N-(2-hydroxypoly(ethyleneoxy-co-propyleneoxy))ethylamine; N-acetyl-N-methyl-2-(hydroxypolyethyleneoxy)ethylamine; N-acetyl-N-methyl-2-(hydroxypolypropyleneoxy)ethylamine; N-acetyl-N-ethyl-2-(hydroxypolyethyleneoxy)ethylamine; N-acetyl-N-ethyl-2-(hydroxypolypropyleneoxy)ethylamine; N-acetyl-N-methyl-3-(hydroxypolyethyleneoxy)propylamine; N-acetyl-N-methyl-3-(hydroxypolypropyleneoxy)propylamine; N-acetyl-N-ethyl-3-(hydroxypolyethyleneoxy)propylamine; N-acetyl-N-ethyl-3-(hydroxypolypropyleneoxy) propylamine; N-acetyl-N-phenyl-2-(hydroxypolyethyleneoxy)ethylamine; N-acetyl-N-4-pyridyl-2-(hydroxypolyethyleneoxy)ethylamine; 2-acetamidophenol; 3-acetamidophenol; 4-acetamidophenol; 2-acetamidophenoxypolyethyleneglycol; 3-acetamidophenoxypolyethyleneglycol, 4-acetamidophenoxypolyethyleneglycol, 2-acetamidophenoxypolypropyleneglycol, 3-acetamidophenoxypolypropyleneglycol, 4-acetamidophenoxypolypropyleneglycol 2-acetamidophenoxypoly (ethylene-co-propylene) glycol, 3-acetamidophenoxypoly (ethylene-co-propylene) glycol, 4-acetamidophenoxypoly (ethylene-co-propylene) glycol, an alkylene(alkyleneoxide) reaction product of a hydroxyamide which comprises a cyclic or a heterocyclic structure, and mixtures thereof.

6. An ink jet ink composition according to claim 5, wherein at least one oxygen atom of the said oxyalkylene reaction product is replaced by a sulfur atom.

7. An ink jet ink composition suitable for high resolution ink jet printing comprises:
water;
a colorant selected from the group consisting of a dye, a pigment, and a mixture of a dye and pigment; and a material selected from the group consisting of a hydroxyamide derivative; a mercaptoamide derivative having at least one mercaptol group and at least one amide group; a hydroxythioamide derivative having at least one hydroxyl group and at least one thioamide group; a mercaptothioamide derivative having at least one mercaptol group and at least one thioamide group; an oxyalkylene reaction product of said derivatives; a thioalkylene reaction product of said derivatives; and mixtures thereof,
wherein said hydroxyamide derivative has at least two hydroxyl groups and at least one amide group and is represented by the following formula:

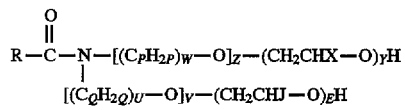

wherein,
R is independently selected from the group consisting of $C_nH_{2n+1}$ wherein n is from seven to forty, cyclic $C_nH_{2n-1}$ wherein n is from one to forty, $C_6H_5$, $C_5H_4N$, substituted or unsubstituted aromatic groups and heterocyclic groups with carbon atoms from three to twenty, and $OC_nH_{2n+1}$ wherein n is from one to forty; characters J and X are independently selected from H and $C_kH_{2k+1}$ and k is from zero to twenty; P and Q are independently selected from two to twenty; U and W are independently selected from one to twenty; V and Z are independently from zero to forty; and E and Y are independently selected from zero to forty; Z+Y must be at least one or greater than one; V+E must be at least one or greater than one; and all characters P, Q, U, W, V, Z, E, Y, X, and J are independently selected.

8. The ink jet ink composition according to claim 7, wherein $[(C_QH_{2Q})_U—O]_V]$ and $[(C_pH_{2p})_w—O]_z]$ is independently substituted by a $C_6H_4O$— or an alkyphenoxy group.

9. An ink jet ink composition according to claim 7, wherein at least one oxygen atom of the said hydroxyamide derivative is replaced by a sulfur atom.

10. An ink jet ink composition according to claim 1 further comprising a chemical additive selected from the group consisting of humectants, surfactants, penetrants, pigment dispersing agents, biocides, pH buffering agents, mono-valent ammonium or metal salts, multi-valent metal salts, anti-curl and anti-cockle agents, anti-intercolor bleeding agents, bubble nucleation agents, and chelating agents.

11. An ink jet ink composition according to claim 10, wherein said humectants are selected from the group consisting of beatines; urea; glycol derivatives; diols comprising 2 to 20 carbon atoms with two hydroxyl groups; triols comprising 3 to 20 carbon atoms with three hydroxyl groups; tetraols comprising 4 to 20 atoms with four hydroxyl groups; alkyleneoxide or alkylenesulfide reaction products of the above said humectants; thio derivatives of the above humectants thioglycol derivatives and mixtures thereof.

12. An ink jet ink composition according to claim 1, wherein said colorant is a nontoxic material having a polyaromatic hydrocarbon content of less than 5 parts per million.

13. An ink jet ink composition according to claim 10, wherein said pigment dispersing agents are selected from the group consisting of nonionic, cationic and anionic dispersing agents, and wherein said anionic dispersing agents are selected from the group consisting of polymers and copolymers of naphthalensulfonate salts and an aldehyde, polystyrenesulfonate salts, copolymers of maleic acid salts, copolymers comprising methacrylic or acrylic acid salts, and mixtures thereof.

14. An ink jet ink printing process comprising applying an ink jet ink composition according to claim 1 onto a print substrate with an ink jet printhead in any desired pattern in a single pass or a multiple pass method according to digital signals.

15. An ink jet printing process comprising applying an ink jet ink composition according to claim 7 onto a print substrate with an ink jet printhead in any desired pattern in a single pass or a multiple pass method according to digital signals.

16. An ink jet printing process according to claim 14, wherein said printing process is conducted by at least a thermal ink jet printhead selected from the group consisting of a single printhead, a partial-width printhead and a full-width array printhead.

17. An ink jet printing process according to claim 15, wherein said printing process is conducted by at least a thermal ink jet printhead selected from the group consisting of a single printhead, a partial-width printhead and a full-width array printhead.

18. An ink jet printing process according to claim 16, wherein said thermal ink jet printhead has a resolution which is equal to or greater than 300 spi.

19. An ink jet printing process according to claim 17, wherein said thermal ink jet printhead has a resolution which is equal to or greater than 300 spi.

20. An ink jet printing process comprising printing an ink jet ink composition according to claim 1 wherein said ink jet ink has a latency greater than 10 seconds and a frequency response of at least 3 KHz.

21. A thermal ink jet printing process comprises depositing a set of four or more multi-color ink jet inks by their corresponding printheads in any desired printing method and sequence of said inks according to digital signals onto a print substrate, wherein said set of multi-color ink jet inks has at least one ink jet ink according to claim 1.

22. A thermal ink jet printing process according to claim 21, wherein said printheads are selected from the group consisting of single printheads, partial-width printheads, and full-width array printheads, wherein said printing is at a speed of at least as high as 18 pages per minute.

23. A thermal ink jet printing process according to claim 21, wherein said substrate is optionally heated by a heating means at any stage of an ink jet printing process including before, during, and after printing as well as combinations thereof.

24. A thermal ink jet printing process according to claim 23, wherein said heating means is selected from the group consisting of a radiant heater, a heated roller, a heated platen, a heated drum, a microwave drying device, a heated lamp, hot air, and combinations thereof.

25. An ink jet printing process comprises depositing at least one ink jet ink according to claim 1 by a high resolution thermal ink jet printhead having nozzle openings of 10–49 microns onto a print substrate in either a checkerboard or a single pass method.

26. The ink jet ink printing process according to claim 14, wherein said applying is selected from the group consisting of continuous, drop-on-demand, thermal, piezoelectric, and acoustic.

27. The ink jet ink composition according to claim 11, wherein said thio derivatives comprise alkylthiol derivatives and thioglycol derivatives.

28. The ink jet ink composition according to claim 27, wherein said thioglycol derivative is thiodiethyleneglycol.

29. The ink jet printing process according to claim 19, wherein said resolution is 400 spi or 600 spi.

* * * * *